(12) United States Patent
Everts

(10) Patent No.: US 9,611,757 B2
(45) Date of Patent: Apr. 4, 2017

(54) TURBOCHARGER AIR BEARING

(71) Applicant: Jason P Everts, Eagan, MN (US)

(72) Inventor: Jason P Everts, Eagan, MN (US)

( * ) Notice: Subject to any disclaimer, the term of this patent is extended or adjusted under 35 U.S.C. 154(b) by 410 days.

(21) Appl. No.: 14/452,217

(22) Filed: Aug. 5, 2014

(65) Prior Publication Data

US 2015/0037139 A1 Feb. 5, 2015

Related U.S. Application Data

(60) Provisional application No. 61/862,397, filed on Aug. 5, 2013.

(51) Int. Cl.
*F16C 32/06* (2006.01)
*F01D 25/22* (2006.01)
*F04D 29/051* (2006.01)
*F04D 29/057* (2006.01)
*F02C 6/12* (2006.01)

(52) U.S. Cl.
CPC .............. *F01D 25/22* (2013.01); *F02C 6/12* (2013.01); *F04D 29/057* (2013.01); *F04D 29/0513* (2013.01); *F05D 2220/40* (2013.01); *Y10T 29/49236* (2015.01)

(58) Field of Classification Search
CPC .... F16C 17/205; F16C 27/02; F16C 32/0603; F16C 32/0666; F16C 32/0674; F16C 32/0677; F16C 32/0696; F01D 25/22; F04D 29/0513; F04D 29/057
See application file for complete search history.

(56) References Cited

U.S. PATENT DOCUMENTS

| 3,675,355 A | * | 7/1972 | Shanok | ............... G09F 13/0404 |
| | | | | 40/596 |
| 4,573,808 A | | 3/1986 | Katayama | |
| 6,457,311 B2 | | 10/2002 | Fledersbacher et al. | |
| 2002/0131656 A1 | * | 9/2002 | Knepper | ............... C23C 14/025 |
| | | | | 384/110 |
| 2006/0248887 A1 | | 11/2006 | Arnold | |

FOREIGN PATENT DOCUMENTS

| EP | 0212091 | | 3/1987 | |
| EP | 2273087 | | 1/2011 | |
| FR | 1400683 A | * | 5/1965 | ............. F16C 27/02 |

* cited by examiner

*Primary Examiner* — Phillip A Johnson
(74) *Attorney, Agent, or Firm* — Boyle Frederickson S.C.

(57) ABSTRACT

An air bearing assembly includes a split bearing with a first portion and a second portion configured to join and form a female tapered section with distal ends of a larger diameter than a joining central portion. A shaft with a male section including distal ends of a larger diameter than a central portion mates with the female tapered section formed by the joined split bearing. In order to provide adequate lubrication, support, and cooling, one or more an passages in the split bearing fluidly communicates a supply of pressurized air to the shaft. The air pressure provides a cushion of air for the shaft to float on during operation.

20 Claims, 6 Drawing Sheets

TURBOCHARGER AIR BEARING

CROSS-REFERENCE TO RELATED APPLICATION

This application claims a benefit of priority based on Provisional Patent Application No. 61/862,397 filed Aug. 5, 2013, the entire contents of which are hereby expressly incorporated by reference into the present application.

BACKGROUND OF THE INVENTION

Field of the Invention

The present invention relates in general to the field of turbochargers. More particularly, the present invention relates to lubrication of turbochargers.

Discussion of the Related Art

Internal combustion engines operate as an pumps. That is to say, they draw in air, combine it with fuel, and produce energy. This energy is realized as power when the air-fuel mixture is ignited. Afterward, the waste created by the combustion is expelled. All of this is typically accomplished in four strokes of the pistons.

As internal combustion engines are not perfectly efficient, there is always an amount of wasted energy that is expelled with the exhaust. Turbochargers harness some of the wasted energy by fitting more air into the engine's combustion chambers, which may then be combined with more fuel, and creates a greater amount of power. The turbocharger accomplishes this task by compressing the air molecules so that the air the engine draws in is more dense.

A turbocharger uses the hot, expanding exhaust gases leaving the engine after combustion. These gases are routed directly to the turbine wheel side of the turbocharger to make it rotate. That turbine wheel is connected by a shaft to a compressor wheel. As the turbine wheel spins faster and faster, it causes the compressor wheel, and shaft, to also spin quickly. The rotation of the compressor wheel pulls in ambient air and compresses it before pumping it into the engine's combustion chambers. The compressor wheel, shaft, and turbine rotate at speeds up to 150,000 rpm.

Fluid bearings are commonly required within the turbocharger to prevent failure of the shaft at such high rotation speeds. The fluid bearings support the shaft on a layer of oil that is pumped around the shaft, cooling it and preventing friction. The fluid bearings typically employ a bronze material, forming a journal surrounding the shaft. In recent times, ball bearings have become more prevalent. Use of ceramics and high temperature alloys has made ball bearings more prevalent in turbochargers. Ball bearings reduce the contact area the shaft and bearing have, reducing friction. As there still is an element of friction, oil is commonly used as a lubricant for any turbocharger, regardless of the bearing type.

Some systems utilize a sealed oil to lubricate the turbocharger. More commonly, the engine's oil ,system is plumbed into the turbocharger's bearings to provide lubrication. Oil is commonly used as oil technology provides a low-cost friction reducing material that can withstand the temperatures and pressures of exhaust gases produced by an internal combustion chamber and withstand rotational speeds up to 150,000 rpm.

The use of oil is not, however, without its drawbacks. The shaft still comes in contact with the bearings, even if they are ball bearings. Oil's lubrication properties break down after use and exposure to the harsh environments of an internal combustion engine. This requires repeated maintenance of draining and filtering the oil. Oil is also an expensive commodity that has risen in price over recent decades.

What is therefore needed is an improved lubrication device that can withstand the volatile environments a turbocharger produces, while offering proper cooling and lubrication to a turbocharger's bearings. An additional need is for a turbocharger bearing that further reduces the friction a shaft is subjected to. Lastly, the lubrication would preferably be renewable, low cost, and readily available to all turbocharging enthusiasts.

SUMMARY AND OBJECTS OF THE INVENTION

The preferred embodiments disclosed herein relate to lubrication and cooling of a turbocharger's shaft. Pressurized air may be supplied to a split bearing through air passages. The shaft may then ride on a cushion of air without making any contact on frictional surfaces within the turbocharger's cartridge.

An air bearing assembly may include a split bearing with a first portion and a second portion configured to join and form a female tapered section with distal ends of a larger diameter than a joining central portion. A shaft with a male section including distal ends of a larger diameter than a central portion may mate with the female tapered section formed by the joined split bearing. In order to provide adequate lubrication, support, and cooling, a plurality of air passages in the split bearing may fluidly communicate a supply of pressurized air to the shaft. The air pressure provides a cushion of air for the shaft to float on during operation.

The air bearing may further include a bearing housing with a first spring chamber configured to receive a first spring. The first spring applies a pressure to the first portion of the split bearing against the male section of the shaft. A second spring chamber may also be provided in the bearing housing and configured to receive a second spring. The second spring may apply a pressure to the second portion of the split bearing against the male section of the shaft.

The bearing housing may include a first half configured to removably attach to a second half encasing the split bearing and the shaft in a central portion of the housing.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
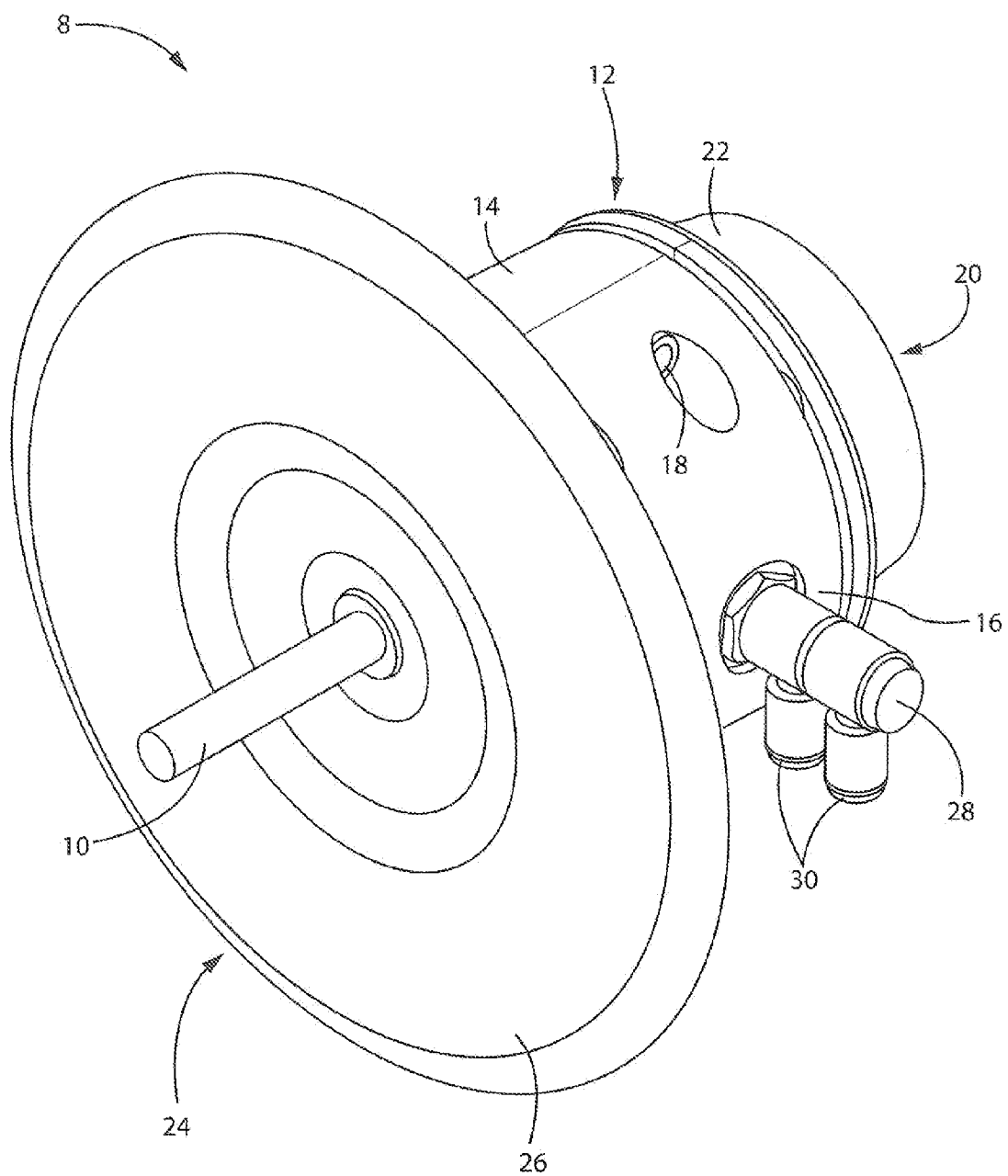
FIG. 1 illustrates an isometric view of a turbocharger air bearing housing according to the preferred embodiment.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. They are not limited to direct connection but include connection through other elements where such connection is recognized as being equivalent by those skilled in the art.

DETAILED DESCRIPTION OF EMBODIMENTS

The present invention and the various features and advantageous details thereof are explained more fully with reference to the non-limiting embodiments described in detail in the following description.

The inventive air hearing utilizes a split bearing to provide a cushion of pressurized air to a turbocharger's shaft. The air pressure cools the shaft and provides for a near-frictionless journal.

Beginning with FIG. 1, a turbocharger cartridge 8 is shown with the inventive air bearing assembly. Externally, the cartridge 8 appears similar to a conventional turbocharger except for an inlet fitting 28 protruding from the side of a housing second half 16. Air inlet fitting 28 provides access to the air bearing assembly, described in FIGS. 2-6, through one or more air inlets 30. A housing 12 is split into two halves, a housing first half 14 and the housing second half 16. The split housing 12 provides access to the internals of the cartridge 8, specifically the air bearing assembly. Housing fasteners 18 hold the respective housing halves 14, 16 together, sealing the air bearing assembly within. Extending through the central aids of the housing 12 is a shaft 10 that may support a compressor wheel (not pictured) on the compressor side 24 and also a turbine (not pictured) on the turbine side 20. A. back plate 26 provides a sealing surface for a compressor housing (not pictured) which may be machined to match the particular compressor wheel used. The back plate 26 may be sized to any standard size to accommodate any compressor wheel and compressor housing combination. On the turbine side 20, a heat shield 22 is provided to help shield away heat from exhaust gases that pass through the turbine. Just as with the compressor side 24, the turbine side 20 may accommodate any turbine wheel and turbine housing combination. The compressor housing and turbine housings may attach to the cartridge 8 with any known attachment means including, but not limited to, snap rings, bolts, band clamps, and v-band fasteners.

Figure 2:
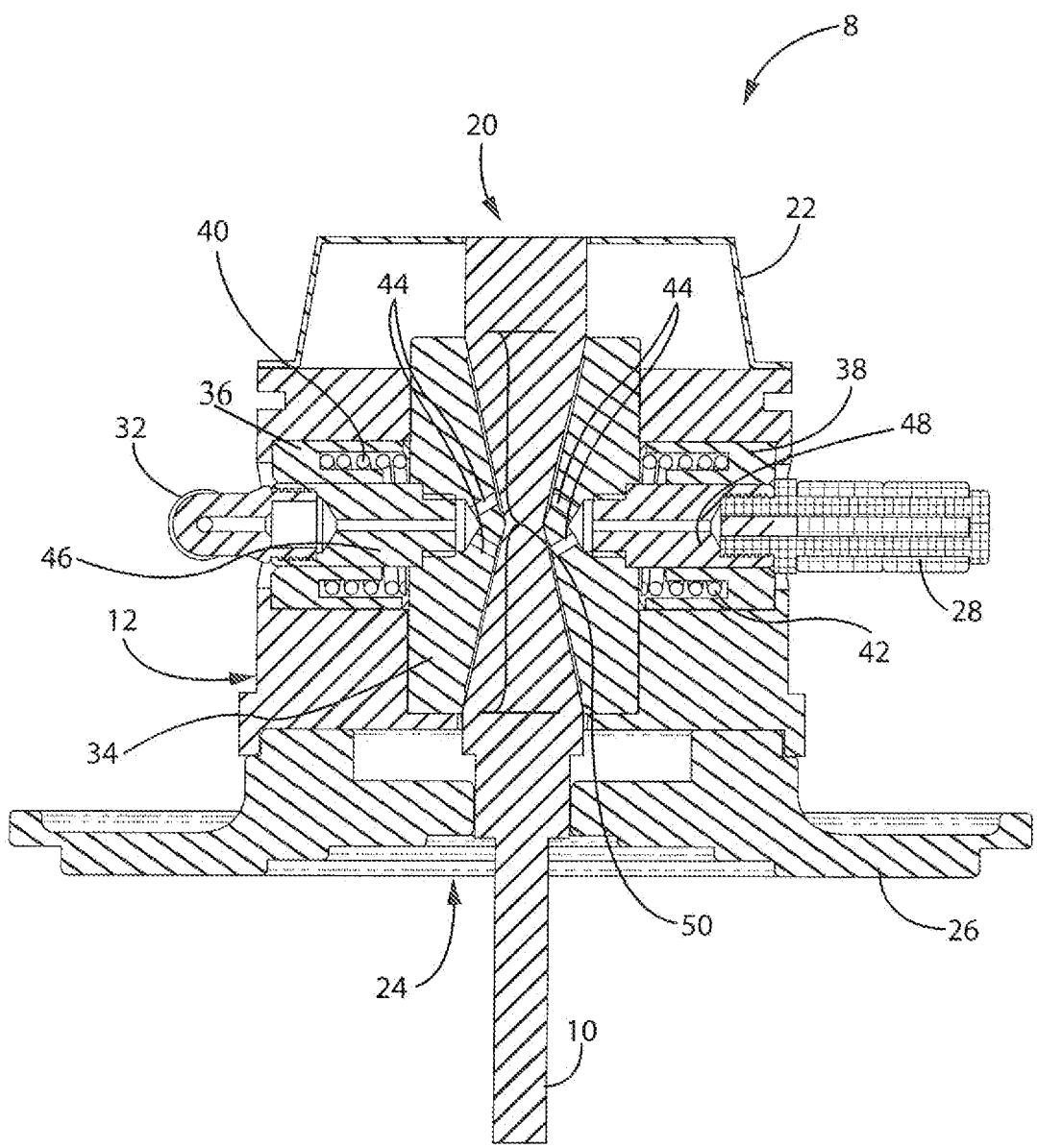
FIG. 2 illustrates cross sectional view of the bearing housing along section A-A according to FIG. 4.
Figure 4:
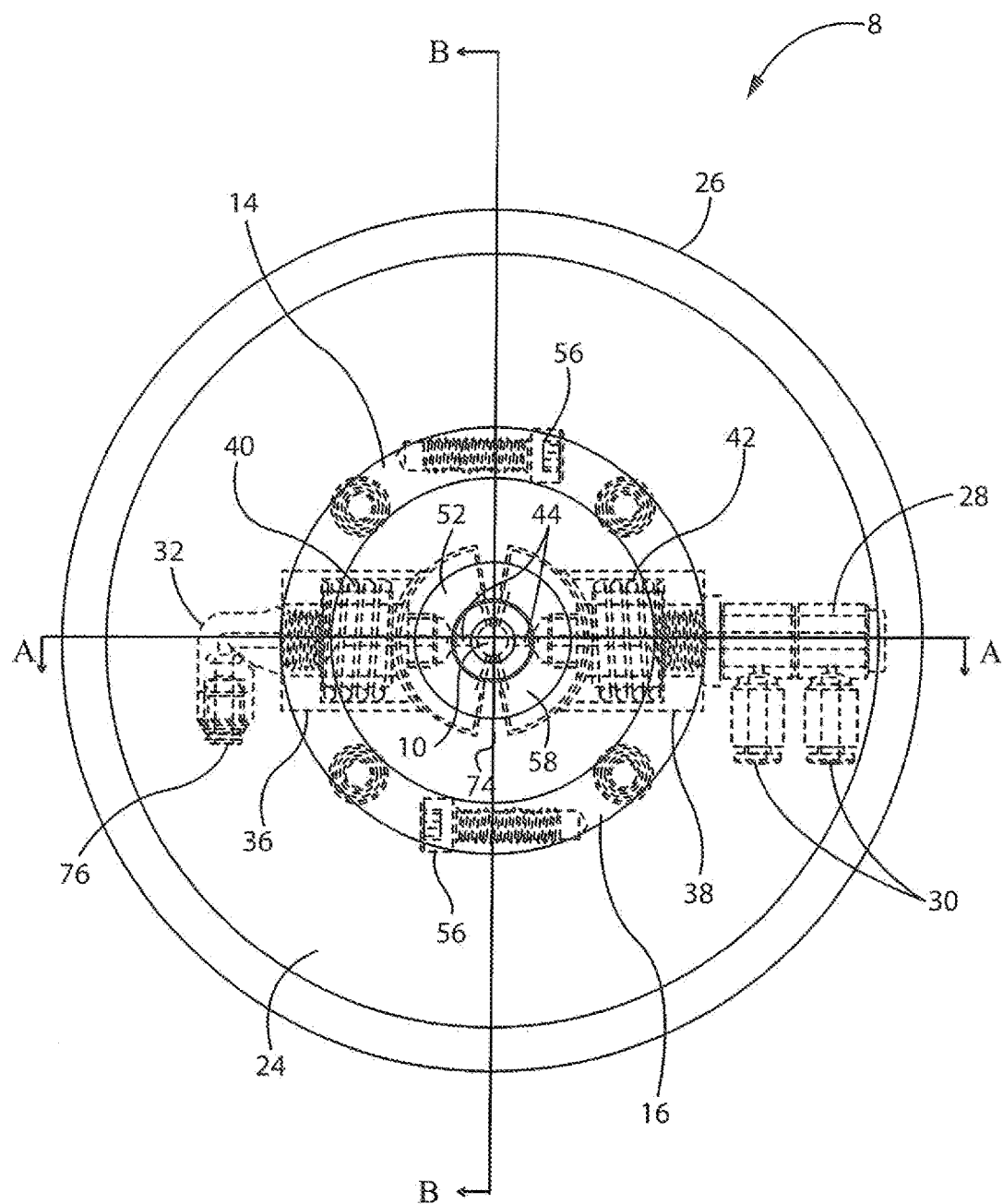
FIG. 4 illustrates an end view showing hidden lines of a bearing assembly within the bearing housing of FIG. 1.

Moving on to FIG. 2, a cross sectional view of the cartridge 8 is shown about section line A-A, which is referenced in FIG. 4. The section bisects the cartridge 8 into two equal halves. In operation, pressurized air is supplied to air inlet fitting 28. Pressurized air may originate from any source, but is preferably supplied by an air compressor (not pictured) mounted in or proximate the engine bay. The air compressor may be powered by the engine through electric energy generated by an alternator, a battery, or directly off the crankshaft of the engine.

The pressurized air enters the air inlet fitting 28 and travels through an orifice in a second spring chamber 38. The pressurized air then passes through a series of split bearing air passages 44 and surrounds the shaft taper section 50. Similarly, an additional air outlet fitting 32 may also supply pressurized air through a first bearing insert 46 and through the split bearing an passages 44 of the split bearing 34. A first bearing spring 40 is retained in a first spring chamber 36 and a second bearing spring 42 is retained in a second spring chamber 38. The first and second bearing springs 40, 42 exert pressure against the split bearing 34 to push the split bearing first half 52 and the split bearing second half 58 against the shaft taper section 50 of the shaft 10, see FIG. 6. Once sufficient air pressure is built up, the air pressure between the shaft taper section 50 and the split bearing 34 pushes the split bearing 34 away from the shaft taper section 50. At this point, the shaft is supported on a cushion of air, producing near-zero friction. When the air pressure falls below the sufficient amount, the first bearing spring 40 and second bearing spring 42 push the split bearing 34 against the shaft taper section 50 to provide support to the shaft. Preferably, whenever the engine is operating at sufficient loads to rotate the shaft 10, the air compressor is supplying sufficient air pressure to the split bearing 34 to produce a cushion of air, preventing any rotational contact between the shaft 10 and the split bearing 34. Some rotational contact between the shaft 10 and the split bearing 34 may occur during start up and shut down of the engine, however the split bearing 34 may be constructed out of a material such as oil impregnated brass or any other known bearing material that can withstand this type of friction.

Figure 3:
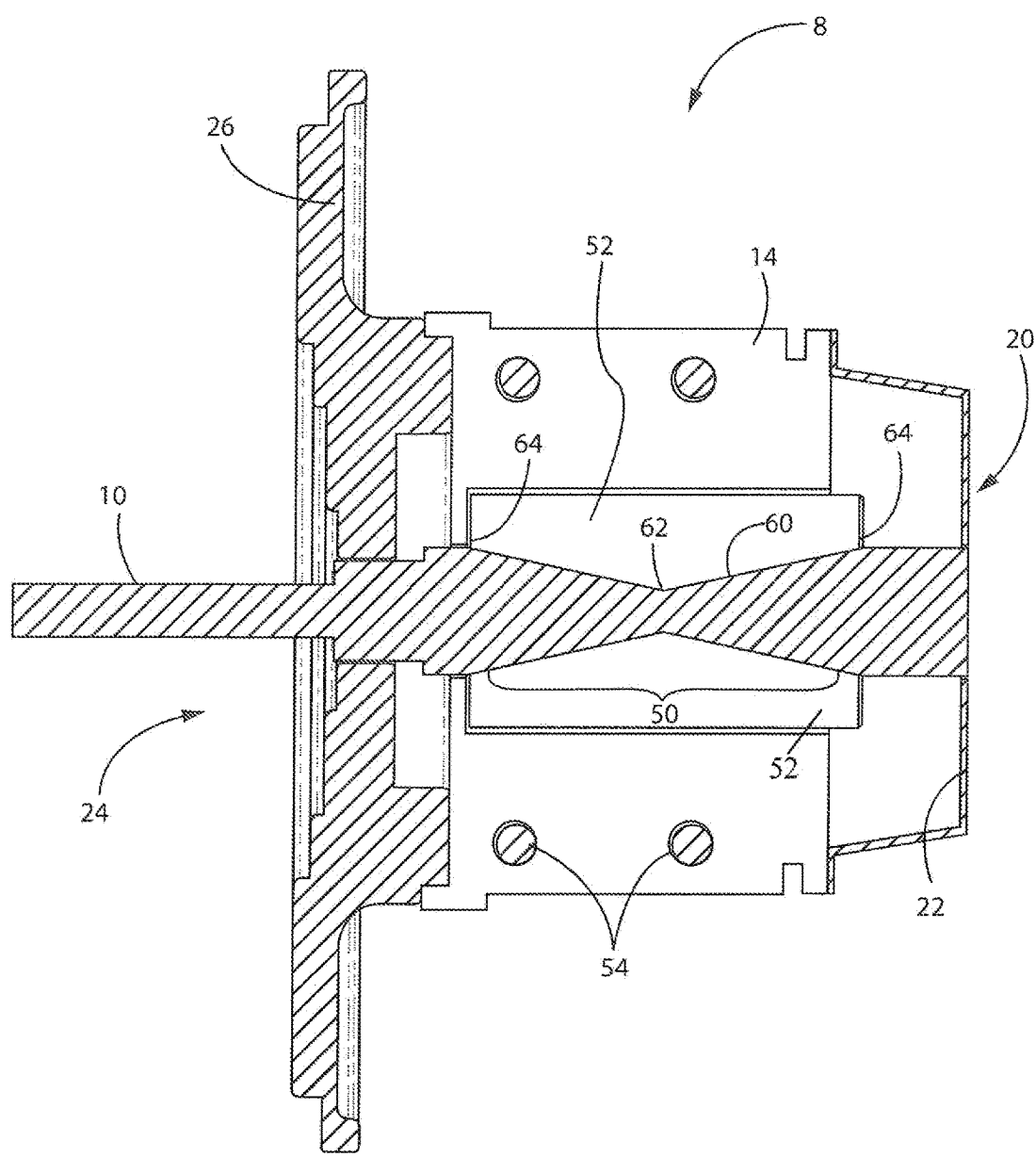
FIG. 3 illustrates a cross sectional view along section 13-13 according to FIG. 4.

Transitioning to FIGS. 3 and 4, a cross sectional view of the cartridge 8 is shown about section line B-B in FIG. 3 (referenced in FIG. 4), while FIG. 4 shows a side view of the cartridge 8 from the compressor side 24. The housing 12 is disassembled in this view by removing housing fasteners 18, see FIG. 1, and exposing the housing fastener holes 54. The housing first half 14 is essentially a mirror image of the housing second half 16, see FIG. 4, except the housing fastener holes 54 on the housing second half 16 are counter bored for fastener heads.

The split bearing first half 52 includes distal ends 64 and a central portion 62. A female taper 60 is formed in the split bearing first half 52 and receives the shaft taper section 50 of the shaft 10. The split bearing second half 58 is similarly shaped and rests in the housing second half 16, as shown in FIG. 4. The split bearing first and second halves 52, 58 are formed such that the female taper 60 includes distal ends 64 that are of a larger diameter than the central portion 62. The shaft taper section 50 is also formed with a similar taper, and fits within the female taper of the split bearing first half 52 and split bearing second half 58 when the housing 12 is assembled.

As mentioned with respect to FIG. 1, the back plate 26 may support a compressor housing while a compressor wheel may be attached to the compressor side 24 of the shaft 10. Similarly, a turbine housing may be attached to the turbine side 20 of the housing and a turbine may be attached to the turbine side 20 of the shaft 10 to complete the turbocharger assembly.

The split bearing 34, the housing 12, and the entire air bearing assembly is shown in phantom. The shaft 10 is supported about the central axis of the housing 12. The split bearing first half 52 and split bearing second half 58 are pressed against the shaft 10 by the first bearing spring 40 and the second bearing spring 42, respectively. When the split bearing first half 52 and split bearing second half 58 are joined together within the housing first half 14 and the housing second half 16, a gap 74 remains between the respective split bearing halves 52, 58.

While the air inlet fitting 28 and air outlet fitting 32 may provide pressurized air to the split bearing first half 52 and split bearing second half 58 any combination of air outlet 76 and air inlets 30 may be used to supply pressurized air or to bleed out pressurized air and control pressure with a regulator. Additionally, any style of air fitting may be used as the air outlet fitting 32 and air inlet fitting 30. The fittings may also include any amount of air inlets 30 and air outlets 76.

Figure 5:
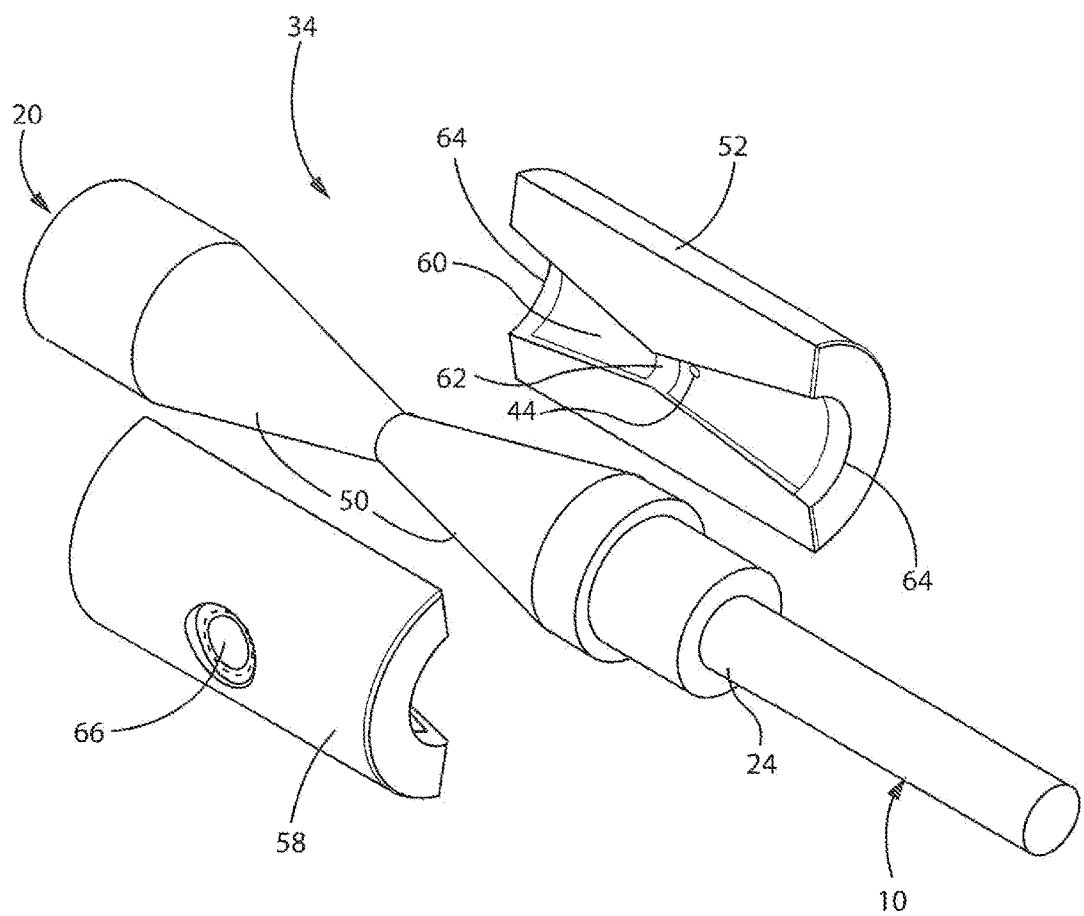
FIG. 5 illustrates an isometric view of the air bearing and shaft of the air bearing housing in FIG. 1.

FIG. 5 shows the shaft 10 and the split bearing 34 removed from the housing 12. The split bearing first half 52 is symmetrical and a mirror image of the split bearing second half 58. On one side of each split bearing half a split bearing air inlet/outlet 66 allows for air to both enter and exit the female taper 60 through split bearing air passages 44. As previously mentioned, the air passages 44 provide a pathway for pressurized air to be supplied to the distal ends 64 and central portion 62 of the female taper 60 of the split bearing 34. The pressurized air supports the shaft taper section 50 of the shaft 10 which in turn floats the shaft on a cushion of air while the shaft rotates in operation. The shaft taper section 50 and the female taper 60 of the split bearing 34 prevents axial movement of the shaft 10. Typically, a thrust bearing is needed for turbocharger shafts for any axial forces. The dual taper on the distal ends of the split bearing provide axial forces in both directions to effectively cancel out any axial forces and ensure the shaft 10 remains in place.

Figure 6:
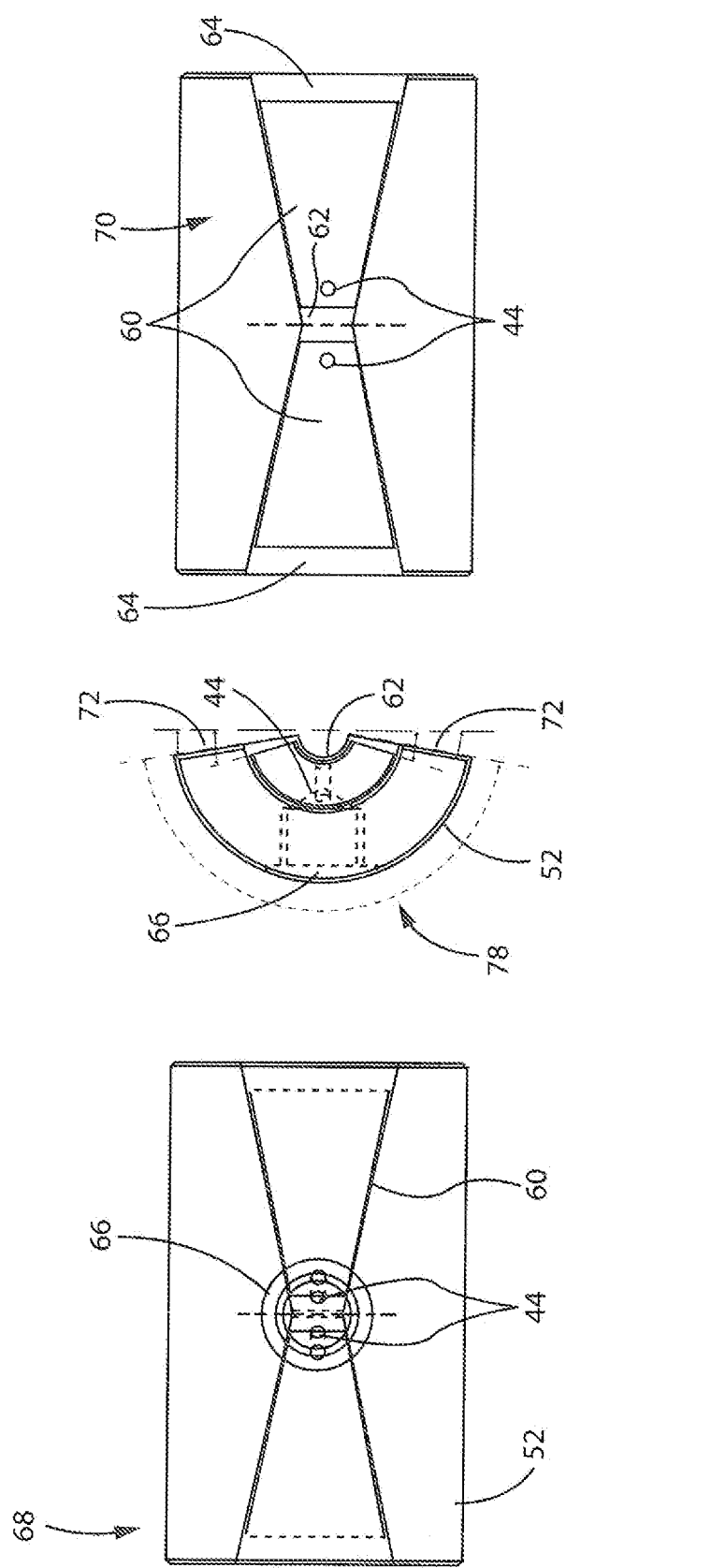
FIG. 6 illustrates a side, end, and section view along section A-A of the air bearing within the bearing housing of FIG. 1

Moving on to FIG. 6, the sides and end of the split bearing first half 52 is shown. Note that the split bearing second half 58 is essentially the same as the split bearing first half 52. The air inlet/outlet side 68 shows the split bearing air inlet/outlet 66 and the female taper 60 is shown in phantom. It can be seen that the split bearing air passages 44 are angled such that they are normal to the female taper 60 surface. Looking at the female taper side 70, the distal ends 64, central portion 62, and split bearing air passages 44 are shown. The distal ends 64 of the female taper 60 are preferably of a larger diameter than the central portion 62. While the shape of the taper may vary to include any shape, a dual tapered design provides axial stability, as previously discussed.

Looking at the distal side of the split bearing first half 52 a recess 72 is included on the surface of the split bearing first half 52. This recess from the vertical allows for expansion of the split bearing 34 as temperature rises and prevents the split bearing first half 52 from binding against the split bearing second half 58. The split bearing air inlet/outlet 66 provides a path for pressurized air to flow through the split bearing passages 44 and into the central portion 62 of the female taper 60 to support, cool, and lubricate the shaft 10.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

Moreover, the individual components need not be formed in the disclosed shapes, or assembled in the disclosed configuration, but could be provided in virtually any shape, and assembled in virtually any configuration. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

The invention claimed is:

1. A turbocharger bearing assembly comprising:
   a cylindrical split bearing, comprising:
      a first half portion;
      a second half portion; and
      a hollow female taper section formed by joining the first and second portions;
   a tapered shaft having a central portion accommodated within the hollow female taper section such that the cylindrical split bearing is located on the central portion of the tapered shaft; and wherein
   an air inlet delivers and maintains a compressed air at a predetermined pressure such that the tapered shaft rides on an air cushion when in operation.

2. The turbocharger bearing assembly of claim 1, wherein a pair of distal ends of the cylindrical split bearing have a diameter greater than that of a central portion of the cylindrical split bearing.

3. The turbocharger bearing assembly of claim 1, wherein a pair of distal ends of the tapered section of the tapered shaft have a greater diameter than the central portion.

4. The turbocharger bearing assembly of claim 1, wherein the cylindrical split bearing contains at least one air passage configured to fluidly communicate pressurized air from the first portion of the split bearing to the second portion of the split bearing.

5. The turbocharger bearing assembly of claim 4, wherein the at least one air passage surrounds the tapered section of the tapered shaft.

6. The turbocharger bearing assembly of claim 1, wherein the bearing housing includes a first half and a second half and wherein the first half is removably attachable to the second half such that the split bearing and the shaft are encased in the bearing housing.

7. The turbocharger bearing assembly of claim 1, wherein the tapered shaft is in contact with the split bearing when not in operation.

8. A turbocharger bearing assembly comprising:
   a cylindrical split bearing including a first portion and a second portion configured to join and form a hollow tapered section including distal ends of a larger diameter than a joining central portion;
   a cylindrical shaft with a tapered section including distal ends of a larger diameter than a central portion configured to mate with the hollow tapered section of the split bearing formed by the joined split bearing;
   one or more air passages in the split bearing configured to fluidly communicate a pressurized air from the first portion of the split bearing to the second portion of the split bearing and surround the tapered section of the shaft within the female hollow tapered section of the split bearing; and
   an air bearing formed by the pressurized air configured to support the cylindrical shaft.

9. The turbocharger bearing assembly of claim 8, further comprising:
   a bearing housing with a fast spring chamber configured to receive a first spring, wherein the first spring applies a pressure to the first portion of the split bearing against the tapered section of the shaft; and a second spring chamber in the bearing housing configured to receive a second spring, wherein the second spring applies a pressure to the second portion of the split bearing against the tapered section of the shaft.

10. The turbocharger bearing assembly of claim 8, further comprising a bearing housing including a first half configured to removably attach to a second half encasing the split bearing and the shaft in a central portion of the housing.

11. The turbocharger bearing assembly of claim 10, further comprising
at least one spring chamber in the bearing housing configured to provide a pre-load to the split bearing; and wherein
the pre-load places the split bearing in contact with the shaft when in a non-operation mode.

12. The turbocharger bearing assembly of claim 8, wherein at least one of the air passages is configured to remove the pressurized air from the central portion of the shaft.

13. The turbocharger bearing assembly of claim 8, further comprising:
a housing configured to support the shaft and split bearing;
at least one spring in the housing configured to provide a pre-load to the split bearing; and wherein
the pre-load places the split bearing in contact with the shaft when in a non-operation mode.

14. The turbocharger bearing assembly of claim 13, wherein the pressurized air overcomes the pre-load and suspends the shaft on the air bearing when in an operation mode.

15. A. method of operating a turbocharger bearing assembly comprising the steps:
providing a tapered shaft with distal ends of greater diameter than a central portion;
providing a split bearing with a central opening and with two halves;
assembling the halves so as to accommodate the central portion of the tapered shaft in the central opening of the two halves;
containing the tapered shaft and split bearing within a bearing housing;
providing a pressurized an flowing through the bearing housing and to the central opening of the split bearing; and
suspending the central portion of the tapered shaft on an air cushion when the turbocharger bearing assembly is in operation.

16. The method of operating the turbocharger bearing assembly of claim 15, further comprising:
providing a spring proximate each of the halves of the split bearing;
providing a pre-load to each of the halves of the split bearing with the springs such that the halves of the split bearing are in contact with the tapered shaft when not in operation.

17. The method of operating the turbocharger bearing assembly of claim 15, further comprising:
providing a spring chamber in the housing proximate each half of the split bearing;
providing a spring in each one of the spring chambers proximate each of the halves of the split bearing;
providing a pre-load to each of the halves of the split bearing with the springs such that the halves of the split bearing are in contact with the tapered shaft when not in operation; and
overcoming the pre-load with the pressurized air such that an air bearing is formed between the tapered shaft and the split bearing when in operation.

18. The method operating the turbocharger bearing assembly of claim 15, further comprising:
providing at least one air passage in the housing and flowing the pressurized air through the housing and to the split bearing; and
providing at least one additional air passage in the housing and flowing the pressurized air from the split bearing and out of the housing.

19. The method of operating the turbocharger bearing assembly of claim 15, further comprising:
moving each half of the split bearing away from the tapered shaft when going from a not-operating state to an operating state; and
moving each half of the split bearing toward the tapered shaft when going from the operating state to the not-operating state.

20. The method of operating the turbocharger bearing assembly of claim 15, further comprising providing an air pump for supplying the pressurized air.

* * * * *